United States Patent
Silton et al.

(10) Patent No.: US 6,327,252 B1
(45) Date of Patent: Dec. 4, 2001

(54) AUTOMATIC LINK ESTABLISHMENT BETWEEN DISTRIBUTED SERVERS THROUGH AN NBMA NETWORK

(75) Inventors: Roderick P. Silton; Sirish Bajpai, both of Herndon, VA (US)

(73) Assignee: Alcatel Canada Inc. (CA)

( * ) Notice: Subject to any disclaimer, the term of this patent is extended or adjusted under 35 U.S.C. 154(b) by 0 days.

(21) Appl. No.: 09/166,550

(22) Filed: Oct. 5, 1998

(30) Foreign Application Priority Data

Oct. 3, 1997 (CA) .................................................. 2217277

(51) Int. Cl.[7] .................................................. H04L 12/16
(52) U.S. Cl. .............................................. 370/256; 709/225
(58) Field of Search .................................... 370/395, 396, 370/397, 469, 399, 466, 400, 254, 255, 256, 465, 401, 410, 474, 475; 709/222, 225, 249, 245, 220

(56) References Cited

U.S. PATENT DOCUMENTS

| | | | | |
|---|---|---|---|---|
| 5,574,860 | * | 11/1996 | Perlman .................................. | 709/220 |
| 5,822,320 | * | 10/1998 | Horikawa ................................ | 370/396 |
| 5,854,901 | * | 12/1998 | Cole ........................................ | 709/245 |
| 6,016,319 | * | 1/2000 | Kshirsagar ............................. | 370/410 |
| 6,032,194 | * | 2/2000 | Gai ......................................... | 708/239 |
| 6,047,329 | * | 4/2000 | Horikawa ................................ | 709/238 |
| 6,069,895 | * | 5/2000 | Ayandeh ................................. | 370/399 |

OTHER PUBLICATIONS

The ATM Forum Technical Committee; Private Network–Network Interface Specification Version 1.0 (PNNI 1.0); af–pnni–0055.000, Mar. 1996.

The ATM Forum Technical Committee; ATM User–Network Interface (UNI) Signaling Specification Version 4.0; af–sig–0061.000, Jul., 1996.

\* cited by examiner

*Primary Examiner*—Douglas Olms
*Assistant Examiner*—Richardo M. Pizarro
(74) *Attorney, Agent, or Firm*—Larson & Taylor, PLC

(57) ABSTRACT

The invention relates to distributed computer or server networks and to methods of automatically establishing communication links between individual servers in the network. By taking advantage of the properties of group addresses (anycast addresses) inherent in certain networking technologies, coupled with innovative discovery and hunt protocols the servers in the network all become members of an overlay spanning tree where the tree is comprised of servers as nodes and communication links as edges. Discovery and hunt protocols are implemented to locate peer servers in the network and communication links are set up as required.

16 Claims, 1 Drawing Sheet

NOTE: DIRECTION OF ARROW DENOTES DIRECTION OF VC SETUP

US 6,327,252 B1

AUTOMATIC LINK ESTABLISHMENT BETWEEN DISTRIBUTED SERVERS THROUGH AN NBMA NETWORK

FIELD OF THE INVENTION

The present invention relates to automatically establishing links between distributed data processing servers connected to a non-broadcast mutli-access (NBMA) communications network, such as an asynchronous transfer mode (ATM) network.

BACKGROUND OF THE INVENTION

In computer networks it is often advantageous to provide a distributed computer system consisting of multiple computers which work with each other in an automated and controlled manner, in order to improve system reliability or increase system performance, for instance, when compared to a single computer effecting similar functionality.

A key requirement for such distributed computing systems is the need to maintain communication links between the individual computers, which are commonly referred to as servers. Frequently this is accomplished by creating a mesh of connections whereby each server has a link to every other server in the group or cluster manifesting the distributed system, but this is often impractical due to the large number of links for even moderately sized clusters.

Known problems concerning the communications infrastructure to link the various servers include:

1) Discovery of servers;
2) Minimizing link cost;
3) Ensuring reliability;
4) Avoiding looping;
5) Minimizing link establishment time; and
6) Implementation and administrative complexity.

A technique that solves one or more of these problems is desirable.

SUMMARY OF THE INVENTION

It is an object of the present invention to provide a new and improved methodology for establishing links between multiple servers connected to a communications network.

The invention, therefore, according to a first exemplary aspect provides a method of automatically establishing a link between a newly initialized data processing server and distributed data processing servers connected to a communications network comprising: arranging the distributed data processing servers in an interconnected configuration; initiating a discovery addressing protocol by the newly initialized server to discover other servers within the interconnected configuration; and forming a communications link between the newly initialized computer and at least one of the distributed data processing servers in the interconnected configuration upon discovery thereof.

In a particular embodiment of this aspect of the invention, the discovery address is re-initialized for a set number of times in the event of a failure to discover a peer server. If a peer server is not discovered a hunt addressing protocol is initialized.

In accordance with a second exemplary aspect of the invention, there is provided a method of automatically re-establishing links between distributed data processing servers in a communications network in the event of network failure, the method comprising: arranging the servers in an interconnected configuration; initiating a hunt addressing protocol by servers in the interconnected configuration to locate peer servers; and establishing communication links between the located servers.

Distributed computing where the underlying communications infrastructure is an NBMA based communications network characterizes a preferred embodiment of the invention. Examples of such a network include an ATM network or other types of virtual connection oriented digital communications networks.

The automatic link establishment technique embodying the present invention results in the interconnection of a plurality of servers, for example in the form of a spanning tree, which advantageously is an arrangement having a minimum number of links and avoids loops. Advantages of the discovery process whereby new servers connect to the tree include minimum link cost at the time of connection (i.e., each server will be connected to its nearest peer), and administration of the process is relatively simple, in that there are only two required configuration parameters (anycast addresses), and the parameters are common to all servers for a group. The resulting tree is self-healing, in that the technique enables automatic rebuilding of the cluster after a link or server failure. No redundant links are required due to this self-healing capability, which is administratively simple to effect.

BRIEF DESCRIPTION OF THE DRAWINGS

The invention will be better understood from the following embodiment description together with reference to the accompanying drawings, in which.

DETAILED DESCRIPTION

Figure 1:
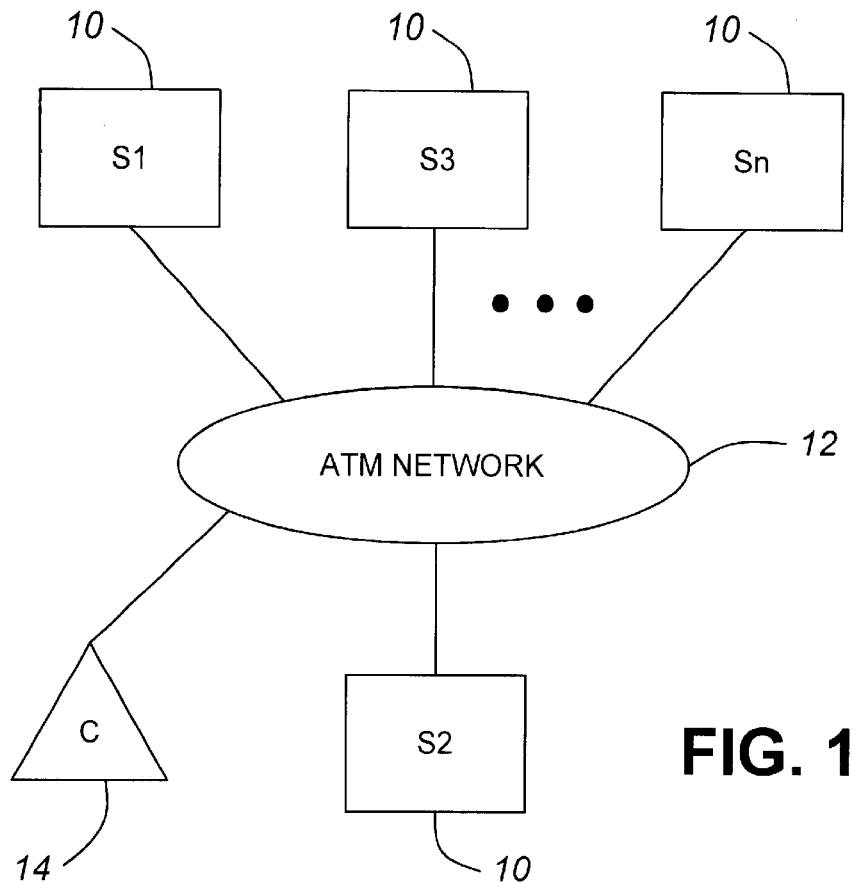
FIG. 1 is a schematic diagram illustrating a plurality of servers connected to an ATM network.

Referring to FIG. 1, shown is a particular implementation environment for the present invention comprising a plurality of servers 10, respectively labeled S1, S2, S3 . . . Sn, which are connected to and may be interconnected through an ATM network 12. The plurality of servers 10 constitute a distributed computer system that can be accessed by any client device 14 through the network 12. The distributed system is not a static entity, but rather the number of servers 10 forming the distributed system may change dynamically. For example, if a particular server, say Sn, is newly initialized and/or connected to the network 12, it must discover one of its peer servers, S1, S2, S3, in order to be added to the distributed system.

Figure 2:
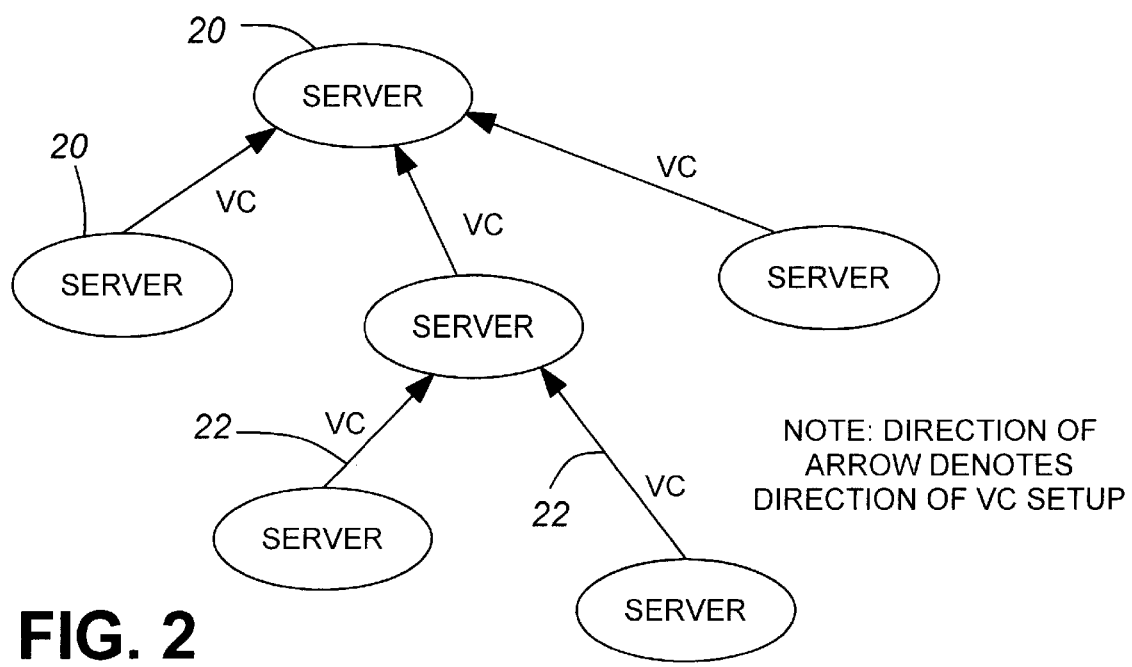
FIG. 2 is a schematic diagram representing a spanning tree resulting from a server discovering its peers.

As a result of discovery of a server by its peer servers, in accordance with the invention, all the servers 10 effectively are members of a cluster which is topologically organized as an overlay spanning tree, as shown in FIG. 2. The tree is comprised of servers 10 as nodes 20 and communication links 22 as edges. The communications links 22 may be virtual circuits (VCs), such as a switched VC (SVC), through the ATM network 12 of FIG. 1.

The attaching VC link 22 will be setup by every server 10 of the distributed system using a predetermined anycast address. The group of servers shares a common anycast address.

Anycast addressing is a well know capability of ATM networks 12, that allows a user to request a point-to-point connection to a single ATM end system which may be a single data processing device or a group of such devices typically provisioned to share the processing workload. An ATM switching system, for example the Mainstreet 36170 multi-service switch provided by Newbridge Networks, permits an attached device to register an anycast address in addition to its unicast (natural) address. A conventional method for distributing anycast addresses is through the Private Network to Network Interface (PNNI) routing protocol. Once registered, these addresses are passed to other ATM switches in the network 12. Several devices may register to the same anycast address. Each ATM switch within the scope of the registration is able to map the anycast address to the unicast address of the closest (or only) element in the ATM network 12 that provides the type of service associated with it. Refer to "ATM User-Network Interface (UNI) Signaling Specification", Version 4, July 1996, for more details on ATM anycast capability, and "Private Network-Network Interface Specification", Version 1, March 1996, for more details on PNNI.

There are two fundamental phases to building the tree arrangement of servers in an automated manner:

a) Discovery: This comprises the joining of new servers into the current tree; and b) Hunting: This comprises the re-attachment of tree fragments after network or server disruption.

Different nodes may be executing either of the phases at any given time. Automatic server discovery greatly eases administration of the cluster as new nodes can be added without reconfiguration of existing nodes 20. The hunt phase provides recovery of the cluster after a link 22 or node 20 (server) failure. These failures would otherwise result in fragmentation of the tree resulting in loss of communication between the servers. The hunt phase is so named because each root node of a fragment searches for root nodes of other fragments. Once found the fragments will be reattached thus restoring communication.

The discovery phase proceeds as follows. The very first server attempting to attach itself (i.e., no existing servers) becomes the root of the tree. A new server is discovered by the distributed system (i.e., cluster of existing servers) when it first attaches itself to this tree. As shown in FIG. 2, the servers 10 corresponding to the nodes 20 of the spanning tree have been discovered in the distributed system, in that each server has a VC connection or link 22 established to one of its peer servers, except of course the root server.

A server attempting to attach itself to the tree for the first time is said to be operating in discovery mode. Operation in discovery mode begins with the server attempting to establish a VC to a discovery anycast address associated with the particular server group or cluster that it desires to join. If the server successfully establishes the VC to this address, then the server to which it has connected is considered a parent and this server becomes a child node. The server next registers the discovery anycast address with the network. Registration informs the ATM network that the server is a member of the anycast group. Note that the server may not register the discovery anycast address prior to connection as it would otherwise connect to itself. At this point the server is a member of the cluster. The server, furthermore, maintains information respecting its parent (i.e., the node or server to which it is connected by the successfully established VC), such as the parent's natural ATM address and the status of the link therebetween.

If the VC is not setup successfully in this first attempt, the server may retry a fixed number of times to establish a, VC to the discovery anycast address, for example, three retries at one second intervals. If after such retries the VC is still not established, the server then declares itself as being the root of the tree and enters the hunt mode, which is further described below. The absence of a parent address is flagged internally by the server, to reflect that it constitutes the root node.

A server 10 will enter hunting mode if it detects loss of VC connection from its attachment point on the tree or if it can not establish a VC at all during discovery. The loss of connection may be declared after several attempts to re-establish a VC connection to the parent node's natural address. As described above, the latter case would apply to the very first server to come up in the ATM network 12 (or to the very first server to come up in any individual segment of a partitioned ATM network). A server 10 will come out of the hunting mode when it establishes a successful VC connection on a hunt anycast address. This signifies that it has successfully attached itself as a child of the server on the other side of the VC. The server next registers the discovery anycast address with the network, which as for the discovery phase informs the ATM network that the server is a member of the anycast group. At this point the server is a member of the cluster.

The hunt procedure consists of successive registration of a hunt anycast address by each hunting node followed by a period of de-registration and trying to connect a VC on that same hunt address. The registered and de-registered phases of the hunt will occur in a semi-random fashion so as to allow overlap of registered phase with de-registered phase among other (i.e., multiple) hunting nodes. For instance, different time intervals may be used for the registered phase and the de-registered phase, as well as varying these at each server 10. The hunt anycast address is not the same as the servers' discovery anycast address. The discovery address may also be used by the client devices 14 to communicate with the servers 10.

In steady state, under normal conditions there will a single fragment, namely the spanning tree arrangement of servers with the root in hunting mode as described above.

Note that the cost of the links is minimized both because no redundant links are required (due to the self-healing nature), and because in general each server will be connected to its nearest peer at the time of connection. The tree topology also eliminates problems with routing loops.

Those skilled in the art will recognize that various modifications and changes could be made to the invention without departing from the spirit and scope thereof. For example, an ATM network has been described above as the preferred implementation environment but the invention may be readily applied to other NBMA communications environments. It should therefore be understood that the claims are not to be considered as being limited to the precise embodiments set forth above, in the absence of specific limitations directed to each embodiment.

We claim:

1. A method of joining a new server to a group of zero or more servers connected via a non-broadcast multi-access (NBMA) communications network comprising the steps of:

in a first mode, attempting to establish a connection between the new server and an anycast address associated with the group of servers that the new server desires to join; and if the new server successfully establishes the connection to the anycast address, it registers the anyeast address with the communications network whereby registration informs the network that the new server is joined to the group of servers having the anycast address, and the new server maintains information respecting another server in the group to which it is connected including a natural address of the another server.

2. The method as defined in claim 1 wherein, if the connection is not successfully established on a first attempt, the new server retries to establish the connection.

3. The method as defined in claim 2 wherein the new server makes up to three retries at one second intervals to establish a connection to the anycast address.

4. The method as defined in claim 1 wherein if the new server fails to establish a connection to the anycast address it declares itself to be a root node and enters into a second mode.

5. The method as defined in claim 4 wherein said anycast address comprises a discovery address.

6. The method as defined in claim 4 wherein said second mode comprises a hunt mode.

7. A method of joining a new server to a group of interconnectable zero or more servers via a non-broadcast multi-access (NBMA) communications network comprising the steps of:

attempting to establish a connection between the new server and a discovery anycast address associated with the group of servers that the new server desires to join; if the new server successfully establishes the connection to the discovery anycast address the new server registers its discovery anycast address with the communications network whereby registration informs the network that the new server is joined to the group associated with the anycast address and the new server maintains information respecting another server in the group to which it is connected including a natural address of the another server, and if the new server does not successfully establish a connection to the discovery anycast address, the new server declares itself to be a root node and flags this status internally to reflect that it is a root server.

8. The method according to claim 7 wherein if the new server is unable to successfully establish a connection to the discovery anycast address after a preset number of attempts, it enters a hunting mode in which the new server attempts to establish a connection on a hunt anycast address.

9. The method of claim 8 wherein the new server also enters the hunting mode upon detection that a connection between said new server and a group of servers has been lost.

10. A method of joining a new server to a group of servers via a non-broadcast multi-access (NBMA) communications network comprising the steps of:

successively registering the new server to an anycast address followed by a period of de-registering and attempting to establish a connection on the anycast address and continuing the registering and de-registering steps until a successful joining of the new server to the group of servers is established and, if no such successful joining is established, attempting to join the new server to the group of servers using a hunt anycast address.

11. The method of claim 10 wherein the anycast address to which the new server is successively registered is a hunt anycast address.

12. The method of claim 10 wherein the new server attempts to join the group of servers after a loss in a connection between the new server and the group of servers has been detected.

13. The method of claim 11 wherein the new server attempts to join the group of servers using the hunt address if the new server is unable to establish a connection utilizing a discovery anycast address.

14. The method of claim 13 wherein, if the new server successfully establishes the connection to the anycast address, it registers the anycast address with the communications network whereby registration informs the network that the new server is joined to the group associated with the anycast address.

15. The method of claim 10 wherein the registering and de-registering steps occur in a semi-random fashion.

16. The method of claim 15 wherein different time intervals are used for registering and de-registering.

\* \* \* \* \*